United States Patent
Mann

[11] Patent Number: 5,749,964
[45] Date of Patent: May 12, 1998

[54] BUILDING MATERIAL MIXTURE

[75] Inventor: Heinz-Josef Mann, Saulheim, Germany

[73] Assignee: Hoechst Aktiengesellschaft, Germany

[21] Appl. No.: 754,986

[22] Filed: Nov. 22, 1996

[30] Foreign Application Priority Data

Nov. 25, 1995 [DE] Germany ............... 195 43 933.3

[51] Int. Cl.$^6$ ............... C04B 24/10
[52] U.S. Cl. ............... 106/805; 106/730; 106/823; 106/780; 106/795; 106/14.05; 106/14.39; 106/14.44; 524/2; 524/650
[58] Field of Search ............... 106/780, 805, 106/823, 795, 14.05, 14.44, 14.39, 730; 524/2, 650

[56] References Cited

U.S. PATENT DOCUMENTS

| | | | |
|---|---|---|---|
| 3,869,415 | 3/1975 | Williams . | |
| 4,021,257 | 5/1977 | Bernett . | |
| 4,129,447 | 12/1978 | Roth et al. | 106/823 |
| 4,231,884 | 11/1980 | Dorius | 106/14.39 |
| 4,588,772 | 5/1986 | Bohmer et al. . | |
| 4,784,693 | 11/1988 | Kirkland et al. | 106/805 |
| 5,080,717 | 1/1992 | Young | 106/780 |

FOREIGN PATENT DOCUMENTS

| | | |
|---|---|---|
| 2063011 | 9/1992 | Canada . |
| 0 314 118 | 5/1989 | European Pat. Off. . |
| 0 453 921 | 10/1991 | European Pat. Off. . |
| 0566911 | 10/1993 | European Pat. Off. . |
| 2 539 788 | 7/1984 | France . |
| 2146709 | 3/1973 | Germany . |
| 2917263 | 11/1979 | Germany . |
| 1646495 | 5/1982 | Germany . |
| 3339860 | 5/1985 | Germany . |
| 3910742 | 10/1990 | Germany . |
| 4108286 | 9/1992 | Germany . |
| 1340159 | 12/1973 | United Kingdom . |

OTHER PUBLICATIONS

DataBase Wpi Section Ch, Week 8652 Derwent Publications Ltd., London, GB; & JP 61 256 954 A (Shinetsu Chem Ind KK), Nov. 14, 1986.

*Primary Examiner*—Michael Marcheschi
*Attorney, Agent, or Firm*—Connolly & Hutz

[57] ABSTRACT

A building material mixture for use in manual plasters, gun plasters and knifing fillers having reduced stickiness comprises at least one inorganic binder and a cellulose ether which has been treated with a hydrophobicizing agent.

13 Claims, No Drawings

BUILDING MATERIAL MIXTURE

BACKGROUND OF THE INVENTION

The present invention relates to building material mixtures containing cellulose ethers, and a process for producing them.

Cellulose ethers have been used in modern building material mixtures such as manual and gun-applied plasters for more than 20 years. They significantly increase the water retention of the plaster or render mixture, improve the adhesion and influence the consistency and plasticization.

Plasters must have a sufficient consistency so as not to slip on application to walls and ceilings and also during subsequent leveling. This behavior is achieved by the addition of cellulose ethers to the plaster. However, apart from the desired thickening action, a tendency to stick caused by the cellulose ether also must be accepted. The tendency to stick hinders the application and leveling of the plaster, which is normally carried out manually using a 2 m long smoothing lath.

To reduce the stickiness of plaster, i.e. to improve the plasticization, cellulose ethers modified by additives are customarily used. The most important modifiers for cellulose ethers for building material mixtures are polyacrylamides (DE-A 21 46 7-09, U.S. Pat. No. 4 021 257).

According to DE-A 33 39 860, the cellulose ether can also be optimized for building material mixtures by chemical linkage with polyacrylamides. Cellulose ethers modified by hydrophobic substituents are known as thickeners for protective paints from EP-A 0 556 911.

DE-A 39 10 742 describes the use of hydrophobicized, nonionic cellulose ethers in emulsion paints. The hydrophobicization of a methylhydroxyethylcellulose is achieved by heating the cellulose ether to from 80° to 90° C., spraying on a polyethylene or paraffin oil emulsion and subsequently evaporating the water which was introduced by means of the emulsion. The hydrophobicized cellulose ether used in a commercial emulsion paint improves the scratch resistance of the paint after the latter has cured, but does not influence the process-ability of the paint.

SUMMARY OF THE INVENTION

It is an object of the present invention to make available a building material mixture for manual and machine applied plasters which has a sufficient consistency and a reduced tendency to stick.

Surprisingly, cellulose ethers treated with hydrophobicizing agents in building material mixtures reduce the stickiness of manual and gun applied plasters when incorporated in the aqueous phase of the plaster, without losing its favorable influence on the consistency build-up.

DETAILED DESCRIPTION OF THE INVENTION

The invention provides a building material mixture comprising at least one inorganic binder and at least one cellulose ether which has been treated with a hydrophobicizing agent.

Suitable inorganic binders are preferably cement, lime and plaster of Paris. These binders are present in the amounts customary for building material mixtures, as described, for example, in the Hoechst AG brochure "Modern und rationell Bauen mit TYLOSE® und Hilfsmitteln", January 1990 edition.

Suitable cellulose ethers are preferably commercial, nonionic, water-soluble cellulose ethers, in particular methylcellulose, hydroxyethylcellulose, methylhydroxyethylcellulose, methylhydroxypropylcellulose and ethylhydroxyethylcellulose, which preferably have the following average degrees of substitution (DS) or molar degrees of substitution (MS):

| Cellulose ether | DS | MS |
| --- | --- | --- |
| Methylcellulose | 1.4–2.2 | |
| Methylhydroxyethylcellulose | 1.3–2.0 | 0.05–0.5 |
| Methylhydroxypropylcellulose | 1.3–2.2 | 0.1–1.0 |

The cellulose ethers may preferably be modified with a polyacrylamide. Cellulose ethers modified in this way are known from, for example, DE-A 12 83 726.

The proportion of the cellulose ether in the building material mixtures is preferably from 0.05 to 1.5% by weight, in particular from 0.1 to 1% by weight, based on the total amount of dry matter.

Preferred hydrophobicizing agents are salts of ($C_8$–$C_{22}$)-carboxylic acids, in particular calcium or magnesium stearate, paraffins, in particular ($C_8$–$C_{22}$)-paraffins, polyethylenes having a molecular weight (weight average) of from 1500 to 50,000 g/mol, silicones and siloxanes, in particular dimethylsiloxanes.

The amount of hydrophobicizing agent is preferably from 0.3 to 3% by weight, in particular from 0.5 to 1.5% by weight, based on the cellulose ether.

Further additives which may be present in the building material mixture of the invention are commercial air pore formers, thickeners, dispersants, fluidizers and stabilizers, as are described, for example, in EP-A 0 53 0 768.

Customary inorganic aggregates, for example quartz sand, dolomite, limestone sand, calcium sulfate dihydrate, are also present in the building material mixtures in the amounts known from, for example, the Hoechst AG brochure "Modern und rationell Bauen mit TYLOSE® und Hilfsmitteln", January 1990 edition.

The present invention also provides a process for producing the building material mixtures by combining at least one inorganic binder, customary inorganic aggregates, at least one cellulose ether which has been treated with a hydrophobicizing agent, and also, if desired, further additives.

Preferably, the cellulose ether is first treated with the hydrophobicizing agent and the hydrophobicized cellulose ether is then added to the mixture of the other components. For the hydrophobicization, the cellulose ether is preferably sprayed with an aqueous emulsion or dispersion of the hydrophobicizing agent, in particular at room temperature. Owing to the small amount of water which has to be introduced in this way, for example from 0.5 to 1.5% by weight, storage stability and flowability of the cellulose ether are not adversely affected.

In plaster mixtures containing cellulose ethers which have been treated with a hydrophobicizing agent, the stickiness is significantly reduced and the application and leveling are made considerably easier.

The invention also provides for the method of using the building material mixture in manual plasters, preferably those based on cement, or gun plasters, preferably those based on plaster of Paris, and also in knifing fillers, preferably plaster of Paris knifing fillers.

EXAMPLES

The parts and percentages referred to in the examples are by weight unless indicated otherwise.

The cellulose ethers used for the experiments had the following characteristics:

|  | Degree of etherification | | Viscosity (Höppler, 1.9% strength in water, 23° C.) |
| --- | --- | --- | --- |
|  | DS | MS | [mPa.s] |
| I. Methylhydroxyethylcellulose (MHEC) | 1.50 | 0.12 | 15,000 |
| II. Methylhydroxyethylcellulose (MHEC) | 1.65 | 0.15 | 60,000 |
| III. Methylhydroxyethylcellulose (MHEC) | 1.60 | 0.14 | 10,000 |

Hydrophobicizing agents used were:
A) 50% strength aqueous suspension of calcium stearate in water.
B) 40% strength aqueous, cationic emulsified ($C_8$–$C_{22}$)-paraffin emulsion, and
C) 55% strength aqueous emulsion of a dimethylsiloxane.

The amount of hydrophobicizing agents used in each case was such that the content of active ingredient, based on the amount of cellulose ether, was 0.5% by weight. The hydrophobicizing agent was sprayed on using a commercial spraying apparatus in a suitable mixer. After completion of the spraying procedure, mixing was continued for a further 30 minutes.

The cellulose ethers used were modified with polyacrylamides. The methylhydroxyethylcellulose (MHEC I) used was TYLOSE® FL 15002 (Hoechst AG), the methylhydroxyethylcellulose (MHEC II) TYLOSE® P 60000 Z (Hoechst AG) and the methylhydroxyethylcellulose (MHEC III) TYLOSE® BA 2741 (Hoechst AG).

The treated cellulose ethers were tested in the following building material mixtures. In each case, a formulation with an untreated cellulose ether was employed for comparison.

Composition of the mineral building material mixtures:
1. Plaster of Paris-lime gun plaster
   a) 40 parts of calcium sulfate hemihydrate
      10 parts of calcium hydroxide
      50 parts of limestone sand (0.1–1 mm)
      0.02 parts of olefin sulfonate
      0.01 parts of hydroxypropylstarch
      0.05 parts of tartaric acid
      0.18 parts of MHEC I, untreated (comparison)
   b) same as a), but with 0.18 parts of MHEC I treated with A instead of 0.18 parts of MHEC I, untreated
   c) same as a), but with 0.18 parts of MHEC I treated with B instead of 0.18 parts of HMEC I, untreated
   d) same as a), but with 0.18 parts of MHEC I treated with C instead of 0.18 parts of HMEC I, untreated
   e) same as a), but with 0.17 parts of MHEC II treated with C instead of 0.18 parts of HMEC I, untreated
   f) same as a), but with 0.17 parts of MHEC II treated with A instead of 0.18 parts of HMEC I, untreated
2. Cement-lime undercoat
   a) 12 parts of Portland cement
      5 parts of calcium hydroxide
      10 parts of limestone flour
      73 parts of limestone sand 0.1–1.5 mm
      0.03 parts of olefin sulfonate
      0.01 parts of hydroxypropylstarch
      0.1 parts of MHEC II, untreated (comparison)
   b) same as a), but with 0.16 parts of MHEC II treated with A instead of 0.1 parts of MHEC II, untreated
   c) same as a), but with 0.16 parts of MHEC II treated with B instead of 0.1 parts of MHEC II, untreated
   d) same as a), but with 0.16 parts of MHEC II treated with C instead of 0.1 parts of MHEC II, untreated
3. Plaster of Paris knifing filler
   a) 80 parts of modeling plaster
      20 parts of calcium carbonate flour <0.5 mm
      0.2 parts of TARGON® GA 1 (retarder for plaster of Paris)
      0.5 parts of MHEC III, untreated (comparison)
   b) same as a), but with 0.5 parts of MHEC III treated with A instead of 0.5 parts of MHEC III, untreated
   c) same as a), but with 0.5 parts of MHEC III treated with B instead of 0.5 parts of MHEC III, untreated
   d) same as a), but with 0.5 parts of MHEC III treated with C instead of 0.5 parts of MHEC III, untreated.

The building material mixtures 1 a) to f) and 2 a) to d) were compared with one another in plastering gun tests, and the building material mixtures 3 a)–d) in manual tests in the laboratory. The results were evaluated according to the grading scheme (1=very good, 6=unsatisfactory).

Plaster of Paris-lime gun plaster

|  | 1 a) | 1 b) | 1 c) | 1 d) | 1 e) | 1 f) |
| --- | --- | --- | --- | --- | --- | --- |
| Water throughout [1/h] | 620 | 620 | 620 | 620 | 540 | 540 |
| Consistency, slump [mm] | 168 | 170 | 171 | 172 | 166 | 168 |
| Non-sag performance | IO | IO | IO | IO | IO | IO |
| Application | 2–3 | 1–2 | 2 | 1–2 | 3 | 2 |
| Smoothing | 3 | 1–2 | 2 | 1–2 | 3 | 2 |
| Water retention [%] | 93.4 | 94.5 | 94.5 | 94.0 | 94.1 | 94.7 |
| Adhesive pull strength on concrete [N/mm$^2$] | 0.42 | 0.45 | 0.52 | 0.53 | 0.49 | 0.52 |

Cement-lime undercoat

|  | 2 a) | 2 b) | 2 c) | 2 d) |
| --- | --- | --- | --- | --- |
| Water throughout [1/h] | 420 | 420 | 420 | 420 |
| Consistency, slump [mm] | 171 | 169 | 171 | 173 |
| Non-sag performance | IO | IO | IO | IO |
| Application | 2 | 1 | 1 (-) | 1 |
| Water retention [%] | 91.6 | 91.3 | 91.8 | 91.6 |
| Adhesive pull strength on concrete [N/mm$^2$] | 0.28 | 0.31 | 0.29 | 0.25 |

Plaster of Paris knifing filler

|  | 3 a) | 3 b) | 3 c) | 3 d) |
| --- | --- | --- | --- | --- |
| Water factor | 0.55 | 0.55 | 0.55 | 0.55 |
| Spreading onto plasterboard cardboard | 2–3 | 1–2 | 1–2 | 1–2 |
| Sticking to the tool | significant | little | little | little |

Results

The building material mixtures containing cellulose ethers hydrophobicized according to the present invention (1b–1f, 2b–2d and 3b–3d) showed significant advantages in processing compared with formulations containing the conventional cellulose ethers (1a, 2a and 3a).

What is claimed is:

1. A building material mixture comprising (A) at least one inorganic binder, and (B) a cellulose ether onto which a hydrophobicizing agent has been sprayed.

2. A building material mixture as claimed in claim 1, wherein the hydrophobicizing agent is selected from the group consisting of salts of ($C_8$–$C_{22}$)-carboxylic acids, paraffins, polyethylenes having a molecular weight of from 1500 to 50,000 g/mol, silicones and siloxanes.

3. A building material mixture as claimed in claim 1, wherein the hydrophobicizing agent is selected from the group consisting of calcium stearate, magnesium stearate, ($C_8$–$C_{22}$)-paraffins and dimethylsiloxanes.

4. A building material mixture as claimed in claim 1, wherein the hydrophobicizing agent is present in an amount from 0.3 to 3% by weight, based on the cellulose ether.

5. A building material mixture as claimed in claim 1, including at least one inorganic binder selected from the group consisting of cement, plaster of Paris and lime, and an inorganic aggregate selected from the group consisting of quartz sand, dolomite, limestone sand and calcium sulfate dihydrate, and wherein the cellulose ether is selected from the group consisting of methylcellulose, methylhydroxyethylcellulose and methylhydroxypropylcellulose.

6. A building material mixture as claimed in claim 1, wherein the cellulose ether is treated with polyacrylamide.

7. A process for producing a building material mixture comprising the steps of mixing together at least one inorganic binder, inorganic aggregates, and a cellulose ether treated with a hydrophobicizing agent.

8. The process as claimed in claim 7, including the steps of spraying the cellulose ether with an aqueous emulsion or dispersion of the hydrophobicizing agent, and wherein the hydrophobicized cellulose ether is then added to the mixture of the other components of the building material mixture.

9. A method of using a building material mixture as claimed in claim 1 by adding said mixture to plasters.

10. A method of using a building material mixture as claimed in claim 1 by adding said mixture to fillers.

11. A building material mixture as claimed in claim 1, wherein the cellulose ether is present from 0.05 to 1.5% by weight.

12. A building material mixture as claimed in claim 4, wherein the hydrophobicizing agent is present in an amount from 0.5 to 1.5% by weight, based on the cellulose ether.

13. A building material mixture comprising (A) at least one inorganic binder, and (B) a cellulose ether onto which a hydrophobicizing agent has been sprayed, and wherein the cellulose ether is present from 0.05 to 1.5% by weight, and wherein the hydrophobicizing agent is present in an amount from 0.3 to 3% by weight, based on the cellulose ether.

* * * * *